United States Patent [19]

Schmitz et al.

[11] 3,818,970
[45] June 25, 1974

[54] WEIGHTING BAND FOR CURTAINS, DRAPES, OR THE LIKE AS WELL AS FOR ITS MANUFACTURE

[75] Inventors: Rudolf Schmitz, Kastanienbaum, Switzerland; Franz Baier, Saerbeck, Germany

[73] Assignee: Firma Gardisette GmbH, Zug, Switzerland

[22] Filed: June 2, 1972

[21] Appl. No.: 259,226

Related U.S. Application Data

[62] Division of Ser. No. 782,402, Dec. 9, 1968, Pat. No. 3,684,608.

[30] Foreign Application Priority Data
Dec. 12, 1967 Germany.............................. 51869

[52] U.S. Cl. ............................................. 160/349
[51] Int. Cl............................................. A47h 1/00
[58] Field of Search ............ 160/349, 348; 156/464, 156/203, 519; 161/175

[56] References Cited
UNITED STATES PATENTS
2,474,552  6/1949  Steinmeyer...................... 160/349 X
3,399,713  9/1968  Wilson............................... 160/348
3,577,307  5/1971  Baier et al. ...................... 160/349 X Primary Examiner—Mervin Stein
Assistant Examiner—Philip C. Kannan
Attorney, Agent, or Firm—Craig and Antonelli

[57] ABSTRACT

An apparatus for producing a weighting band for curtains, drapes and the like and the weighting bands produced thereby, in which the lead bodies are arranged at a predetermined spacing within an envelope surrounding the same and in which the lead bodies are retained in the predetermined spacing without the need of a core.

13 Claims, 3 Drawing Figures

PATENTED JUN 25 1974          3,818,970

WEIGHTING BAND FOR CURTAINS, DRAPES, OR THE LIKE AS WELL AS FOR ITS MANUFACTURE

This application is a Divisional Application of the present application Ser. No. 782,402 filed in the U.S. Pat. Office on Dec. 9, 1968 now U.S. Pat. No. 3,684,608.

The present invention relates to a weighting band for curtains, drapes or the like as well as to a method and apparatus for the manufacture of such bands.

A weighting-band or cord for curtains, drapes or the like, with a plastic material hose surrounding small lead bodies either connected by a thread or also arranged loosely adjacent one another has already been proposed heretofore whereby the hose-like envelope or casing consists of a foil strip of polyterephthalate or similar synthetic resinous materials, preferably polyesters which is closed after the insertion of the lead bodies by means of a longitudinal seam.

In the use of lead bodies, not connected by means of a core, i.e., not connected and mutually spaced by means of a thread, for the manufacture of a weighting band, the difficulty resides in that during the application of the lead bodies onto the foil strip, a sliding and displacement of the lead bodies cannot be avoided. It is the aim of the present invention to provide a method which enables the manufacture of a weighting band in which a desired lead body spacing is assured with the use of individual lead bodies. Additionally, a weighting band is intended to be produced by the present invention whose lead bodies cannot be displaced within the foil hose.

The method according to the present invention for the manufacture of a weighting band for curtains, drapes or the like consisting of lead bodies arranged loosely adjacent one another and of an envelope surrounding the same and made of plastic material, whereby the envelope or wrapping surrounding the lead bodies is constituted by a foil strip of polyterephthalate or similar synthetic resinous material which after the insertion of the lead bodies is closed by means of a longitudinal seam, is considered according to the present invention to reside in that a foil strip is provided on one side with a strip of adhesive material, the adhesive material is dried for a short period of time, and at the moment, in which the adhesive material has set or dried to the desired extent, lead bodies are applied onto the foil strip in the desired spacing from each other and are held fast in their position by the adhesive material, and in that foil strip is subsequently folded into a hose-shaped envelope and is held together by the strip of adhesive material.

The individual cylindrically shaped lead bodies are placed on the foil strip with an adjustable spacing to each other and securely adhere on the foil strip by the adhesive material coating previously applied thereon. During the transforming of the foil strip into the hose, the adhesive material coating serves with a corresponding width simultaneously for the closing of the hose in that it forms a seam of adhesive material.

According to a modified method of the present invention, it is possible that two or several separate strips of adhesive material are applied onto the foil strip for maintaining the spacing of the lead bodies and for the formation of the hose.

With the apparatus according to the present invention for the manufacture of the weighting band, the lead bodies are continuously cut off one after the other from a lead wire by a conventional cutting mechanism. Each lead body falls directly after the separating operation onto the strip of adhesive material intended for the adherence of the lead bodies. The spacing of the individual adjacent lead bodies on the foil strip is determined by the feed velocity of the lead wire, by the working cycle of the cutting apparatus and/or also by the feed velocity of the foil strip. Corresponding adjusting mechanisms of any conventional, known construction may be used therefor.

The weighting band manufactured by the aforementioned method in accordance with the present invention is characterized in that the hose-like envelope is provided on its inner wall with one or several coatings of adhesive material, as non-stable securing means of the individual lead bodies arranged at a distance from each other, and with an adhesive material seam.

Accordingly, it is an object of the present invention to provide a weighting band for curtains, drapes and the like as well as a method and apparatus for the manufacture thereof which avoids by simple means the aforementioned shortcomings and drawbacks encountered in the prior art.

It is another object of the present invention to provide a weighting band for curtains, drapes or the like as well as a method for the manufacture thereof which precludes a relative displacement of the lead bodies within the band without the need of a core or the like connecting the individual lead bodies.

A further object of the present invention resides in a weighting band for curtains, drapes and the like as well as in a method for the manufacture thereof which enables the maintenance of an accurately maintained spacing, as desired, between the individual lead bodies.

A still further object of the present invention resides in a weighting band of the type described above as well as in a method for manufacturing the same which involves simple manufacturing steps, dispenses with the need for costly apparatus and results in a weighting band of great uniformity notwithstanding simplicity in its construction.

These and further objects, features, and advantages of the present invention will become more obvious from the following description when taken in connection with the accompanying drawing which shows, for purposes of illustration only, several embodiments in accordance with the present invention, and wherein.

Figure 1:
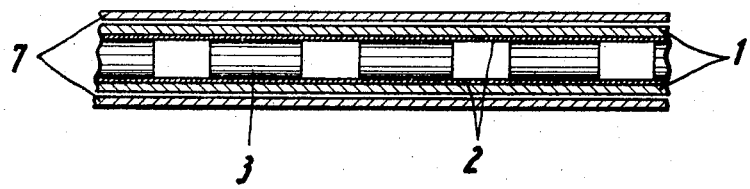
FIG. 1 is a partial longitudinal cross-sectional view through a weighting band with an envelope or cover of textile fabric in accordance with the present invention.
Figure 2:
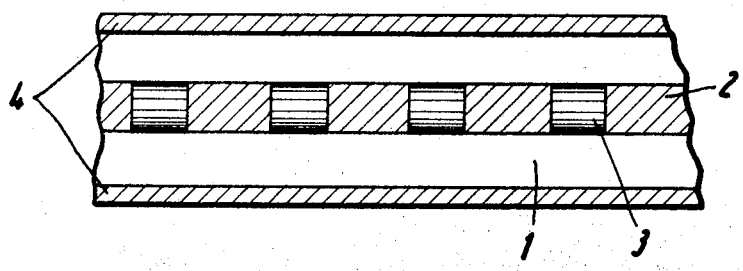
FIG. 2 is a partial cross-sectional view of a modified embodiment of a foil strip provided with adhesive material coating and with a lead body arrangement in accordance with the present invention.

Referring now to the drawing wherein like reference numerals are used throughout the various views to designate like parts, and more particularly to FIG. 1, the weighting band illustrated in this figure consists of a hose-like envelope or casing 1 which is provided at its inner wall with an adhesive material coating 2 for the non-slidable securing of the individual lead bodies 3 arranged loosely at a distance from one another. Additionally, the envelope or casing 1 of transparent plastic foil, for example, of suitable known synthetic resinous material, especially a polyester, foil, of the lead bodies is surrounded by a textile envelope or cover 7 of any suitable material. The foil strip 1' used for the formation of the hose-like envelope or casing 1 is provided with a strip of adhesive material of any suitable, known nature on which are placed at the instant, at which the adhesive material has set or dried to the desired extent, the lead bodies 3 at the desired distance from one another. During the subsequent shaping and transforming of the foil strip 1' into the foil hose 1, the adhesive material coating, with a corresponding width, may serve simultaneously for the hose-closing means under formation of an adhesive beam 4. As illustrated in FIG. 2, separate adhesive material strips may also be provided for the adhesive seam.

Figure 3:
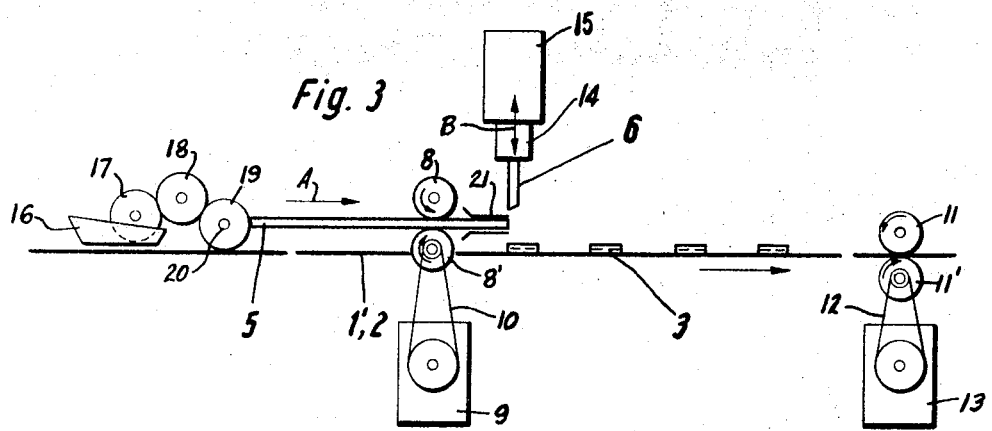
FIG. 3 is a schematic illustration of an apparatus for the separation of the lead wire into lead bodies and for the assembly on a foil strip moving below the same.

The apparatus illustrated in FIG. 3 serves for the manufacture of a weighting band in accordance with the present invention. In this machine a lead wire 5 is conveyed from the left to the right in the direction of arrow A by means of conventional conveyor rollers 8 and 8', driven by means of a belt 10 or the like from a conventional steplessly adjustable drive schematically indicated by reference numeral 9 so that the feed or conveyor speed can be suitably adjusted. The lead wire 5, after passage through guide nozzle 21, is cut and separated into individual lead bodies 3 of identical length at a cutting station of conventional construction which includes a reciprocating knife 6 schematically indicated by double arrow B. For that purpose a conventional guide member 14 is provided which guides the knife 6 during its reciprocations. A conventional adjustable drive means 15 which imparts the reciprocatory movement to knife 6 is of such construction that the working cycle of knife 6 can be controlled timewise.

Conventional feed conveyors 11 and 11' are provided for the foil strip 1', 2, which are again driven by way of a belt 12 or the like from a steplessly adjustable change speed gear, schematically indicated at 13. The foil strip 1', 2 is provided with a coating of adhesive material by means of a conventional gluing installation, as is conventional in the paper processing art, which includes, for example, a tank 16 for the adhesive material. A first roller 17 dips into the adhesive material in tank 16 and cooperates with a distributor roller 18 which transfers the adhesive material in uniform layer thickness onto the applicator rollers 19. The number of applicator rollers 19, mounted on the same shaft 20, is such as corresponds to the number of adhesive material strips on the foil strip 1'. The width of each roller 19 thereby corresponds to the width of the adhesive material strip 2 or 4 to be produced on the foil strip 1'.

The application of the strips of adhesive material on as well as the subsequent folding of the strip into tubular shape may thus be made in any conventional known manner, for example, as described in German application G 44946 X/34e, filed on Oct. 15, 1965 in the name of the assignee of the present application. Any suitable synthetic resinous adhesive material of the fast drying type as known, for instance, in the manufacture of bags, etc., may be used with the present invention. For instance, the adhesive material sold commercially by Henkel of Dusseldorf, Germany, under the name "Pattex" may be used which contains the following indication: "Solvent—containing contact-adhesive on the basis of polychlorobutadiene." However, any other fast-drying synthetic resinous adhesive material may be used, in particular those on the basis of synthetic rubber, such as neoprene or polychlorobutadiene, containing a readily volatile solvent.

The lead bodies thus fall on the foil strip and adhere to the layer of adhesive material. The spacing of the lead bodies on the foil strip can be adjusted by adjusting the wire feed 8, 8', 9, 10, the working cycle of the cutting apparatus 6, 14, 15 and the velocity of the foil strip 11, 11', 12, 13.

While we have shown and described only several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as within the scope of those skilled in the art.

We claim:

1. A weighting band for curtains, drapes or the like comprising:
a hose like envelope,
a plurality of individual small weighting bodies positioned inside of said envelope, said weighting bodies being spaced a predetermined distance from one another in a lengthwise direction of said envelope,
a first adhesive material coating strip interposed between internal wall surfaces of said envelop and said bodies for adhesively retaining said bodies at their respective predetermined spacings from one another,
and at least one further adhesive material coating strip which forms an adhesive seam for the envelope,
wherein all of said adhesive material coating strips extend in the lengthwise direction of said envelope, and wherein said first adhesive material coating strip is separate from and spaced from each of said further adhesive material coating strips in a direction transverse to the lengthwise direction of said envelope.

2. A weighting band according to claim 1, wherein said bodies are lead bodies arranged loosely at said predetermined spacings from one another within said envelope.

3. A weighting band according to claim 1, wherein said envelope is formed of synthetic resinous material foil.

4. A weighting band according to claim 3, wherein said synthetic resinous material foil is a transparent foil formed of polyterephthalate.

5. A weighting band according to claim 4, further comprising a textile outer envelope surrounding said first mentioned envelope.

6. A weighting band according to claim 3, further comprising a textile outer envelope surrounding said first mentioned envelope.

7. A weighting band according to claim 1, wherein said predetermined spacings between said bodies are approximately the same length as the respective individual bodies.

8. A weighting band according to claim 6, wherein said predetermined spacings between said bodies are approximately the same length as the respective individual bodies.

9. A weighting band according to claim 1, wherein each of said adhesive material coating strips have a dimension in a direction transverse to said lengthwise direction substantially less than the internal circumference of said first mentioned envelope.

10. A weighting band according to claim 8, wherein each of said adhesive material coating strips have a dimension in a direction transverse to said lengthwise direction substantially less than the internal circumference of said first mentioned envelope.

11. A weighting band according to claim 1, wherein said further adhesive material coating strips consist of said two strips formed adjacent respective joined edges at said seam, and wherein said first adhesive material coating strip is spaced from said further adhesive material coating strips by non-adhesive coated portions of the internal circumference of said first mentioned envelope.

12. A weighting band according to claim 10, wherein said further adhesive material coating strips consist of two strips formed adjacent respective joined edges at said seam, and wherein said first adhesive material coating strip is spaced from said further adhesive material coating strips by non-adhesive coated portions of the internal circumference of said first mentioned envelope.

13. A weighting band according to claim 1, wherein said adhesive material coating strips are formed of solvent-containing contact adhesive on the basis of polychlorobutadiene.

* * * * *